United States Patent
Ruehle et al.

(10) Patent No.: US 10,868,345 B2
(45) Date of Patent: Dec. 15, 2020

(54) BATTERY MODULE AND USE OF SUCH A BATTERY MODULE

(71) Applicant: Robert Bosch GmbH, Stuttgart (DE)

(72) Inventors: Andreas Ruehle, Bietigheim-Bissingen (DE); Claus Gerald Pflueger, Markgröningen (DE); Jonas Seib, Esslingen (DE); Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 16/049,231

(22) Filed: Jul. 30, 2018

(65) Prior Publication Data
US 2019/0044202 A1 Feb. 7, 2019

(30) Foreign Application Priority Data
Aug. 1, 2017 (DE) .................. 10 2017 213 257

(51) Int. Cl.
| | |
|---|---|
| *H01M 10/653* | (2014.01) |
| *H01M 10/613* | (2014.01) |
| *H01M 10/6554* | (2014.01) |
| *H01M 10/625* | (2014.01) |
| *H01M 10/0525* | (2010.01) |

(52) U.S. Cl.
CPC ..... *H01M 10/653* (2015.04); *H01M 10/0525* (2013.01); *H01M 10/613* (2015.04); *H01M 10/625* (2015.04); *H01M 10/6554* (2015.04); *H01M 2220/20* (2013.01)

(58) Field of Classification Search
CPC .......... H01M 10/653; H01M 10/0525; H01M 10/613; H01M 10/625; H01M 10/6554; H01M 2220/20
See application file for complete search history.

(56) References Cited

U.S. PATENT DOCUMENTS

| | | | |
|---|---|---|---|
| 2005/0074666 A1* | 4/2005 | Kimiya | H01M 10/667 429/62 |
| 2007/0218353 A1* | 9/2007 | Straubel | H01M 10/625 429/120 |
| 2008/0003491 A1* | 1/2008 | Yahnker | H02J 7/0091 429/62 |

(Continued)

FOREIGN PATENT DOCUMENTS

| | | |
|---|---|---|
| DE | 102008034887 A1 | 6/2009 |
| DE | 102011081537 A1 | 2/2013 |
| DE | 102014205133 A1 | 9/2015 |

*Primary Examiner* — Miriam Stagg
*Assistant Examiner* — Lilia Nedialkova
(74) *Attorney, Agent, or Firm* — Michael Best & Friedrich LLP

(57) ABSTRACT

A battery module comprising at least one battery cell (2), in particular a lithium-ion battery cell, and a cooling plate (3) thermally conductively connected to the at least one battery cell (2), a thermal compensation layer (4) configured in order to increase the thermal conductivity between the at least one battery cell (2) and the cooling plate (3) furthermore being arranged between the at least one battery cell (2) and the cooling plate (3), wherein
the thermal compensation layer (4) is formed from a base material (5),
and furthermore comprises at least one bimetallic actuator (6), which has a conversion temperature above a temperature of 20° C.

15 Claims, 1 Drawing Sheet

(56) References Cited

U.S. PATENT DOCUMENTS

| | | | |
|---|---|---|---|
| 2013/0337310 A1* | 12/2013 | Omura | H01M 10/625 |
| | | | 429/120 |
| 2015/0270588 A1* | 9/2015 | Masias | H01M 10/6566 |
| | | | 429/50 |
| 2018/0261813 A1* | 9/2018 | Newman | H01M 10/625 |
| 2018/0269472 A1* | 9/2018 | Ise | H01M 4/244 |

* cited by examiner

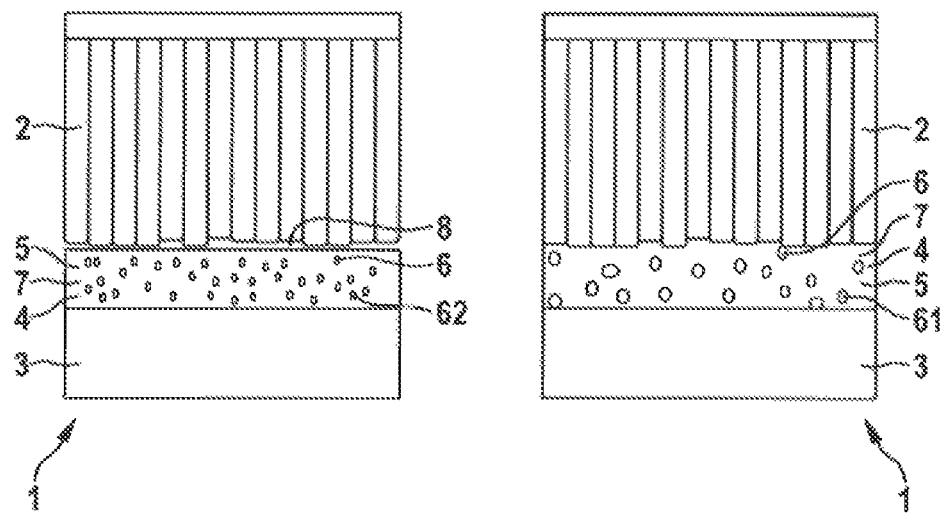
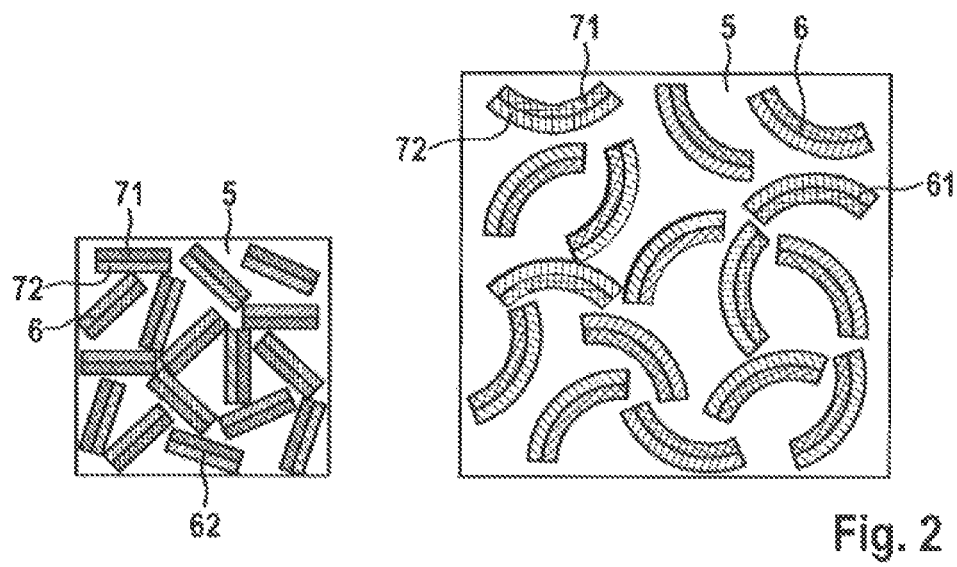

BATTERY MODULE AND USE OF SUCH A BATTERY MODULE

BACKGROUND OF THE INVENTION

The invention is based on a battery module.

The invention furthermore relates to the use of such a battery module.

From the prior art, it is known that battery modules may consist of a multiplicity of individual battery cells, which may be electrically conductively connected to one another in series and/or parallel.

Particularly in electrically operated vehicles (EVs), hybrid electrical vehicles (HEVs), or plug-in hybrid electrical vehicles (PHEVs), battery modules which comprise high-energy and high-power lithium-ion battery cells or lithium-polymer battery cells, and which preferably have about one hundred battery cells, are used in order to be able to satisfy increasing expectations of the driving power.

Because of the chemical conversion processes, the lithium-ion battery cells or lithium-polymer battery cells become heated, particularly when delivering or receiving electrical energy, so that in order to operate such high-performance battery cells in a preferred temperature range, it is furthermore known that battery modules may comprise a thermal regulation system, which is intended in particular to ensure that the battery cells do not exceed a predetermined temperature.

In this case, it is necessary to take into account that the preferred temperature range of lithium-ion battery cells is approximately between 5° C. and 35° C. Furthermore, the lifetime decreases continuously beyond an operating temperature of about 40° C., so that the battery cells should be kept in a thermally non-critical state below 40° C. by means of the thermal regulation system in order to satisfy the requirements of a sufficient lifetime.

Furthermore, the temperature difference between the different battery cells should also not exceed 5 kelvin.

To this end, for example, thermal regulation systems using liquids which flow through cooling plates, for example water/glycol mixtures, are known from the prior art.

It is furthermore known from the prior art to arrange a thermal compensation layer, which is referred to as a "thermal interface material" (TIM), between such cooling plates and the battery cells of the battery module.

SUMMARY OF THE INVENTION

A battery module having the features of the independent claim offers the advantage that thermal conduction between the at least one battery cell and the cooling plate can be formed in a reliable way.

To this end, a battery module is provided which comprises at least one battery cell and a cooling plate.

The battery cell herein is in particular a lithium-ion battery cell. The cooling plate is furthermore thermally conductively connected to the at least one battery cell.

A thermal compensation layer, which is configured in order to increase the thermal conductivity between the at least one battery cell and the cooling plate, is furthermore arranged between the at least one battery cell and the cooling plate herein.

The thermal compensation layer is formed from a base material herein and furthermore comprises at least one bimetallic actuator.

The at least one bimetallic actuator herein has a conversion temperature above a temperature of 20° C.

Preferably, the at least one bimetallic actuator herein has a conversion temperature above a temperature of 30° C.

In particular, the at least one bimetallic actuator herein has a conversion temperature above a temperature of 40° C.

Advantageous refinements and improvements of the device specified in the independent claim are possible by the features mentioned in the dependent claims.

At this point, it should be noted that a bimetallic actuator is intended to mean a metal element which can change repeatedly back and forth between different shapes in the event of a variation in the ambient temperature.

Such a change takes place in this case when exceeding or falling below the so-called conversion temperature.

The different shapes in this case describe, in particular, an expansion or a contraction of the material of the bimetallic actuator or a deformation, for example bending, of the material of the bimetallic actuator.

In particular, the temperature as well as the direction of the change back and forth herein may be defined and adjusted as desired.

In particular, such a change back and forth between different shapes is configured as a reversible process.

A bimetallic actuator may in this case be formed, for example, from two different metal materials connected to one another with a material fit and/or form fit, for example zinc and steel or steel and brass, the two metal materials having a different thermal expansion coefficient.

In this way, with a battery module according to the invention, it is advantageously possible to compensate for tolerance-related surface irregularities of the at least one battery cell, as well as surface modifications occurring because of swelling and shrinking processes of the at least one battery cell during electrical operation of the battery module, so that the thermal conduction between the at least one battery cell and the cooling plate via the thermal compensation layer is maintained.

In this case, by a shape change of the bimetallic actuator, the thermal compensation layer can be adapted to the surface irregularities of the at least one battery cell and the surface modifications of the at least one battery cell.

It is advantageous for the base material of the thermal compensation layer to be formed from an electrically insulating material.

In this way, it is possible to form defined electrical insulation between the at least one battery cell and the cooling plate.

Furthermore, the base material of the thermal compensation layer may be selected in such a way that sufficient thermal conductivity can additionally be formed between the at least one battery cell and the cooling plate.

In particular, the base material of the thermal compensation layer may, for example, be formed from a polymer material or formed as a paste-like or highly viscous material.

At this point, it should once more be noted that the thermal compensation layer is formed in order to increase the thermal conductivity between the at least one battery cell and the cooling plate, so that the base material can have an increased thermal conductivity.

It is expedient for the base material of the thermal compensation layer to be elastically and/or plastically deformable.

In particular, the base material may in this case be reversibly deformable.

In this way, it is possible to compensate for nonuniformities in the arrangement of the at least one battery cell relative to the cooling plate during operation of a battery module.

According to one advantageous aspect of the invention, the at least one bimetallic actuator is arranged inside the base material of the thermal compensation layer.

This has the advantage that, when the conversion temperature of the at least one bimetallic actuator is exceeded, the at least one bimetallic actuator changes its shape, and preferably also expands, so that a distance between the at least one battery cell and the cooling plate can be reduced.

In this way, air gaps formed between the at least one battery cell and the cooling plate can preferably be avoided.

In particular, since air has a relatively low thermal conductivity of 0.026 watts per meter-kelvin, a local thermal barrier layer having a high thermal resistance can therefore be avoided.

It is advantageous for the at least one bimetallic actuator to be arranged between the at least one battery cell and the base material, and/or for the at least one bimetallic actuator to be arranged between the cooling plate and the base material.

This has the advantage that, when the conversion temperature of the at least one bimetallic actuator is exceeded, the at least one bimetallic actuator changes its shape, and preferably also expands, so that a distance between the at least one battery cell and the cooling plate can be reduced.

In this way, air gaps formed between the at least one battery cell and the cooling plate can preferably be avoided.

In particular, since air has a relatively low thermal conductivity of 0.026 watts per meter-kelvin, a local thermal barrier layer having a high thermal resistance can therefore be avoided.

According to one preferred embodiment, the thermal compensation layer comprises a multiplicity of bimetallic actuators.

In this way, it is possible to provide reliable thermal conduction.

According to one expedient aspect of the invention, the at least one bimetallic actuator is configured in such a way that the at least one bimetallic actuator has a first shape above the conversion temperature and a second shape below the conversion temperature.

The first shape and the second shape in this case respectively have a different shape.

In this way, it is possible to provide reliable thermal conduction between the at least one battery cell and the cooling plate.

Advantageously, the thermal compensation layer furthermore comprises at least one phase change material, in which case the thermal dissipation of the at least one battery cell can be increased further.

Furthermore, the invention also relates to the use of a battery module according to the invention in order to increase the thermal conductivity between the at least one battery cell and the cooling plate during operation of the battery module.

A battery module according to the invention may be used for batteries in electrical vehicles, hybrid vehicles and plug-in hybrid vehicles, and in mobile entertainment and communication devices, as well as in static memories and memories for medical purposes, for example intracorporeal batteries.

BRIEF DESCRIPTION OF THE DRAWINGS

Exemplary embodiments of the invention are represented in the drawings and explained in more detail in the description below.

In the figures

FIG. 1 schematically shows one embodiment of a battery module according to the invention having at least one bimetallic actuator, and FIG. 2 schematically shows one embodiment of a bimetallic actuator.

DETAILED DESCRIPTION

FIG. 1 schematically shows one embodiment of a battery module 1.

The battery module 1 in this case comprises at least one battery cell 2, which is in particular a lithium-ion battery cell.

The battery module 1 furthermore comprises a cooling plate 3.

The cooling plate 3 is in this case thermally conductively connected to the at least one battery cell 2.

In order to increase the thermal conductivity between the at least one battery cell 2 and the cooling plate 3, a thermal compensation layer 4 is in this case arranged between the at least one battery cell 2 and the cooling plate 3.

The thermal compensation layer 4 is in this case formed from a base material 5. The base material 5 of the thermal compensation layer 4 is in this case preferably formed from an electrically insulating material 7.

For example, the base material 5 may be formed from a silicone or an epoxide, and in addition may also comprise thermally conductive fillers to increase the thermal conductivity.

Furthermore, the base material may also be formed from a polymer and/or a paste-like or highly viscous material.

Furthermore, the base material 5 of the thermal compensation layer 4 is preferably configured to be elastically and/or plastically deformable.

The thermal compensation layer 4 furthermore comprises a bimetallic actuator 6.

The bimetallic actuator 6 in this case has a conversion temperature above a temperature of 20° C.

Preferably, the bimetallic actuator 6 in this case has a conversion temperature above a temperature of 30° C.

In particular, the bimetallic actuator 6 in this case has a conversion temperature above a temperature of 40° C.

In particular, the thermal compensation layer 4 may in this case comprise a multiplicity of bimetallic actuators 6.

The bimetallic actuator 6 is in this case configured in such a way that it has a first shape 61 above the conversion temperature and a second shape 62 below the conversion temperature.

The right-hand representation of FIG. 1 in this case shows a state of the bimetallic actuator 6 in which it forms a first shape 61, and the left-hand representation of FIG. 1 shows a state of the bimetallic actuator 6 in which it forms a second shape 62.

In particular, it can be seen from the comparison of the right-hand representation of FIG. 1 with the left-hand representation of FIG. 1 that the first shape 61 forms a larger volume than the second shape 62.

In particular, the left-hand representation therefore shows a state in which the temperature is below the conversion temperature, and the right-hand representation shows a state in which the temperature is above the conversion temperature.

FIG. 1 in this case shows an embodiment of the battery module 1 in which the at least one bimetallic actuator 6 is arranged inside the base material 5 of the thermal compensation layer 4.

Of course, it is also possible herein for the at least one bimetallic actuator 6 to be arranged between the cooling plate 3 and the base material 5 of the thermal compensation layer 4.

Of course, it is also possible herein for the at least one bimetallic actuator 6 to be arranged between the at least one battery cell 2 and the base material 5 of the thermal compensation layer 4.

It can be seen herein from the left-hand representation of FIG. 1 that an air gap 8 may be formed between the thermal compensation layer 5 and the at least one battery cell 2.

When the conversion temperature of the at least one bimetallic actuator 6 is exceeded, it changes its shape, and in particular expands, so that overall the thermal compensation layer 4 can be adapted to the at least one battery cell 2 and the air gap 8 can be filled with the material of the thermal compensation layer 4, so that the thermal conductivity can be increased.

FIG. 2 shows one embodiment of a bimetallic actuator 6.

In this case, bimetallic actuators 6 with a second shape 62 are shown in the left-hand representation of FIG. 2, and bimetallic actuators 6 with a first shape 61 are shown in the right-hand representation of FIG. 2.

At this point, it should be noted that the temperature is below the respective conversion temperature in the left-hand representation, and the temperature is above the respective conversion temperature in the right-hand representation.

It can be seen clearly from FIG. 2 in this case that, in particular, the shape of the first shape 61 differs from the shape of the second shape 62, and in particular also forms a larger volume.

It can be seen clearly from FIG. 2 in this case that, besides a mere volume increase, a change in shape is also possible.

In particular, the bimetallic actuators according to FIG. 2 are formed from two metal materials connected to one another with a material fit and/or form fit, the metal materials having a different thermal expansion coefficient.

In particular, the bimetallic actuator according to FIG. 2 comprises a first metal material 71 and a second metal material 72, which are connected to one another with a material fit.

In this case, the first metal material 71 and the second metal material 72 have a different thermal expansion coefficient.

The invention claimed is:

1. A battery module, comprising
at least one battery cell (2),
a cooling plate (3) thermally conductively connected to the at least one battery cell (2), and
a thermal compensation layer (4) configured to increase thermal conductivity between the at least one battery cell (2) and the cooling plate (3), the thermal compensation layer being arranged between the at least one battery cell (2) and the cooling plate (3),
wherein the thermal compensation layer (4) is formed from a base material (5) and comprises at least one bimetallic actuator (6), which has a conversion temperature above 20° C.,
wherein the at least one bimetallic actuator (6) is separate from the battery cell (2), and
wherein the bimetallic actuator (6) is configured to change shape when a temperature of the thermal compensation layer (4) reaches the conversion temperature, thereby causing a volume of the thermal compensation layer (4) to increase so that the thermal compensation layer (4) fills a space between the battery cell (2) and the cooling plate (3) and contacts both the battery cell (2) and the cooling plate (3), so that the thermal compensation layer (4) conducts heat from the battery cell (2) to the cooling plate (3).

2. The battery module according to the preceding claim 1, characterized in that the base material (5) of the thermal compensation layer (4) is formed from an electrically insulating material (7).

3. The battery module according to claim 1, characterized in that the base material (5) of the thermal compensation layer (4) is elastically and/or plastically deformable.

4. The battery module according to claim 1, characterized in that the at least one bimetallic actuator (6) is arranged inside the base material (4).

5. The battery module according to claim 1, characterized in that the at least one bimetallic actuator (6) is arranged between the at least one battery cell (2) and the base material (5).

6. The battery module according to claim 1, characterized in that the thermal compensation layer (4) comprises a multiplicity of bimetallic actuators (6) inside the base material (5), wherein the multiplicity of bimetallic actuators (6) are configured to change shape so that the thermal compensation layer (4) expands when a temperature of the thermal compensation layer (4) reaches the conversion temperature.

7. The battery module according to claim 1, characterized in that the at least one bimetallic actuator (6) is configured in such a way that the at least one bimetallic actuator (6) has a first shape (61) above the conversion temperature and a second shape (62) below the conversion temperature, the first shape (61) and the second shape (62) differing.

8. The battery module according to claim 7, wherein the first shape (61) has a larger volume than the second shape (62).

9. The battery module according to claim 1, characterized in that the thermal compensation layer (4) furthermore comprises at least one phase change material.

10. A method of operating a battery module according to claim 1, the method comprising increasing the thermal conductivity between the at least one battery cell (2) and the cooling plate (3) during operation of the battery module (1).

11. The battery module according to claim 1, wherein the conversion temperature is above 30° C.

12. The battery module according to claim 1, wherein the conversion temperature is above 40° C.

13. The battery module according to claim 1, characterized in that the at least one bimetallic actuator (6) is arranged between the cooling plate (3) and the base material (5).

14. The battery module according to claim 13, characterized in that the at least one bimetallic actuator (6) is arranged between the at least one battery cell (2) and the base material (5).

15. The battery module according to claim 1, wherein the bimetallic actuator (6) is configured to expand when a temperature of the thermal compensation layer (4) reaches the conversion temperature so that the thermal compensation layer (4) fills an air gap (8) between the at least one battery cell (2) and the thermal compensation layer (4).

* * * * *